United States Patent [19]

Rhodes

[11] 4,063,814
[45] Dec. 20, 1977

[54] OPTICAL SCANNER
[75] Inventor: David B. Rhodes, Yorktown, Va.
[73] Assignee: The United States of America as represented by the Administrator of the National Aeronautics and Space Administration, Washington, D.C.
[21] Appl. No.: 674,195
[22] Filed: Apr. 6, 1976
[51] Int. Cl.$^2$ .................. G01P 3/36; G02B 17/00
[52] U.S. Cl. .................................... 356/28; 250/201; 350/204
[58] Field of Search ............... 356/4, 28; 250/201; 350/204

[56] References Cited
U.S. PATENT DOCUMENTS

| | | | |
|---|---|---|---|
| 2,244,687 | 6/1941 | Goldsmith et al. | 350/204 |
| 3,709,579 | 1/1973 | Makosch | 350/204 |
| 3,860,342 | 1/1975 | Orloff et al. | 356/28 |
| 3,897,152 | 7/1975 | Farmer et al. | 356/28 |
| 3,941,999 | 3/1976 | Moyers, Jr. | 356/5 |

Primary Examiner—S. C. Buczinski
Attorney, Agent, or Firm—Howard J. Osborn; William H. King; John R. Manning

[57] ABSTRACT

The invention is an optical scanner that sequentially focuses optical energy (light) at selected points in space. The essential component of the invention is a scanning wheel including several glass windows with each window having a different thickness. Due to this difference in thickness, the displacement of the emerging light from the incident light is different for each window. The scanner transmits optical energy to a point in space while at the same time receiving any optical energy generated at that point and then moves on to the next selected point and repeats this transmit and receive operation. It fills the need for a system that permits a laser velocimeter to rapidly scan across a constantly changing flow field in an aerodynamic test facility.

2 Claims, 1 Drawing Figure

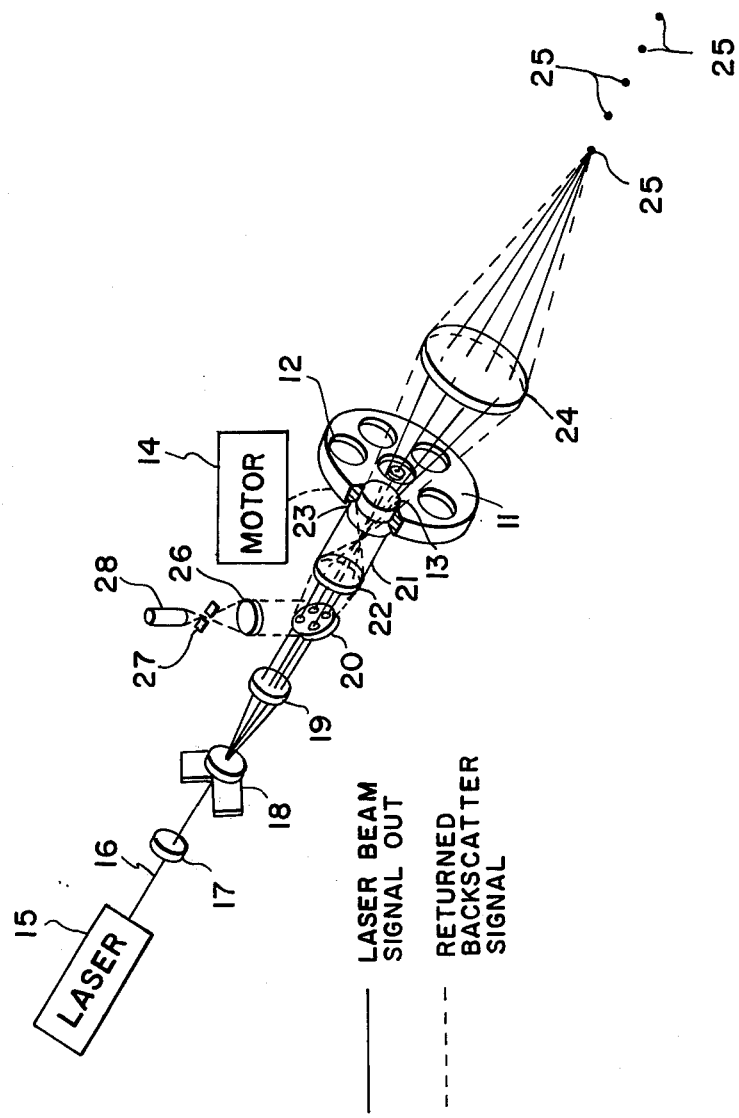

OPTICAL SCANNER

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The invention relates generally to an optical scanner and more specifically concerns an optical scanner for use in laser velocimeter (LV) systems requiring high speed sampling of flows.

There is a need for a device that permits an LV system to rapidly scan across a constantly changing flow field in aerodynamic test facilities. There is no known optical scanner that exists which has a scan rate as high as desired (30 Hertz) and also a scan distance of at least 25 centimeters. Existing optical scanners for LV systems work by zooming lens, but scan rates are low (approximately 1 Hertz).

It is therefore the primary purpose of this invention to provide a simple inexpensive optical scanner that can be used with LV systems requiring high speed sampling of flows.

SUMMARY OF THE INVENTION

The invention includes a scanning wheel containing various thicknesses of plane parallel windows. Laser beams of an LV system are imaged to a primary LV focus within the dead airspace of an optical cell. The beams emerge from this cell and pass through a window of the scanning wheel. The optical material in the window changes the angle of the divergent beams as they enter the window. The beam angle returns to the entry angle (relative to the normal to the window) when the beams emerge. This fact is expressed in Snell's Law and the angle change is dependent on the index of refraction of the window material. The angle change produces an apparent shift of the LV focus within the optical cell. The amount of the apparent shift is dependent on the window thickness. When windows of various thicknesses and a constant index of refraction are placed between the primary LV focus and a reimaging optical system, the apparent shift will be imaged as a real shift in the secondary LV focus within the test zone. A new secondary LV focus will be observed in the test zone along the optical axis corresponding to each window thickness.

The windows are mounted in a wheel so that they can be rapidly placed between the primary focus and the reimaging optics. The scan rate of the secondary LV focus along the optical axis is then equal to the rotational rate of the scanning wheel. Light scattered from the secondary LV focus within the test zone is collected and reimaged through the same optical path which originally projected the primary LV focus. The back-scattered light is reimaged within the optical cell at the primary LV focus and remains stationary even though the secondary focus changes with each new window. This stationary image of the moving secondary focus is possible since the projected and reimaged light have the same optical paths through the plane-parallel windows. The stationary reimaged back-scattered light, which contains the velocity information, is then collected and focused onto a detector system to complete the scanned LV optical system.

BRIEF DESCRIPTION OF THE DRAWINGS

The sole FIGURE in this application is a schematic drawing of the invention.

DETAILED DESCRIPTION OF THE INVENTION

Turning now to the embodiment of the invention selected for illustration in the drawings, the number 11 designates a scanning wheel having several holes 12 therein. Each of the holes 12 has a window of glass 13 inserted therein. The angle of any beam of light passing through a window 13 changes as it enters and returns to the entry angle when it emerges from the window. Hence, there is displacement of the beam by an amount dependant on the index of refraction and thickness of the window. Each window 13 has the same index of refraction as all other windows, but has a thickness that is different from all other windows 13. Consequently, each window 13 will displace an incident beam by a different amount. It is apparent that one of the windows 13 can have zero thickness. Scanning wheel 11 is mounted on a shaft that is rotated by a motor 14. All the windows 13 are an equal distance from the center of scanning wheel 11. Thus, as scanning wheel 11 is rotated by motor 14 the beams of light passing through one of the windows 13 will sequentially pass through all the other windows 13.

All the other equipment shown in the drawing is an LV system for use with the scanning wheel 11. A laser 15 produces a beam 16 that is focused by means of a focusing lens 17. The beam then passes through a Bragg cell 18 or other transducer for adding a bias to the laser frequency to eliminate doppler ambiguities as is well known in the art. The light from Bragg cell 18 is collimated by a collimating lens 19. A titled mirror 20 having holes in it is located in the path of the light from collimating lens 19 for passing the light through the holes. The light passed through mirror 20 passes through an optical cell 21 which includes a focusing lens 22 and a flat piece of glass 23 at its two ends. The light is brought to a primary LV focus within the optical cell and is shielded from any turbulence created by the motion of scanning wheel 11 by means of the flat piece of glass 23. As shown by the solid lines, the light then passes through a window 13 to a reimaging lens 24 where the light is reimaged to a secondary LV focus at a focal point 25 in the test zone. The other focal points 25 within the zone under test are the points where the light is focused when passed through windows 13 having different thicknesses. Hence, as scanning wheel 11 rotates the focal point 25 moves sequentially along a straight line in the direction of reimaging lens 24. Even though one reimaging lens 24 is shown, a two-lens reimaging system can be used. In which case the primary LV focus is located inside the focal length of the first lens. This first lens forms a magnified virtual image of the primary LV focus which is reimaged by the second lens as a real image in the test zone at a focal point 25.

The light reflected from the test zone, as shown by the dotted lines, passes back through the reimaging lens 24 and through the window 13 and refocused within optical cell 21 at the primary LV focus. Then the light passes through lens 22 and reflected by mirror 20 to a refocusing lens 26 and through a pinhole 27 to a detector 28 which detects the back-scattered light from the focal point 25.

In the operation of this invention, one of the windows 13 is alined with the light from optical cell 21. Since all windows 13 are equidistant from the center of rotation of scanning wheel 11, they will be sequentially alined with the light from optical cell 21 as the scanning wheel is rotated. Hence, as scanning wheel 11 rotates the secondary LV focus will sequentially appear at focal points 25. The rate of scan of the focal points 25 is directly proportional to the rate of rotation of the scanning wheel or to the speed of motor 14. The number of focal points 25 that can be scanned can be increased by increasing the number of windows 13.

The advangtages of this invention is that it provides a simple, inexpensive scanning means for an LV system in which the scanning rate can be very high.

What is claimed is:

1. An optical scanner for sequentially focusing a light beam at preselected points in space comprising:

means for producing a light beam;

a scanning wheel having several windows in it positioned such that as the scanning wheel is rotated, said light beam will sequentially pass through said windows;

said scanning wheel having spaces between each pair of adjoining windows which will not pass light whereby when said scanning wheel is rotated said light beam is blocked for a short interval of time between transmissions through successive windows;

each of said windows including means for displacing the emerging light from the incident light by an amount different from the displacements for all other windows;

means for rotating said scanning wheel;

means for bringing said light beam to a primary LV focus before it passes through a window in said scanning wheel;

means for bringing said light beam to a secondary LV focus after it has passed through a window in said scanning wheel; and means for detecting the light energy reflected from the point of said secondary LV focus back through the window that the light beam passed through.

2. An optical scanner according to claim 1 wherein said means for displaying the emerging light from the incident light is glass having the same index of refraction for all windows but having a different thickness for each window.

* * * * *